United States Patent
Xiao et al.

(10) Patent No.: US 10,253,568 B2
(45) Date of Patent: Apr. 9, 2019

(54) PUSH-THE-BIT ROTARY GUIDING DEVICE AND APPLICATION METHOD THEREOF

(71) Applicant: SINOPEC SHENGLI PETROLEUM ENGINEERING CO., LTD., DRILLING TECHNOLOGY RESEARCH INSTITUTE, Dongying, Shandong (CN)

(72) Inventors: Hongbing Xiao, Shandong (CN); Jinzhou Yang, Shandong (CN); Laiju Han, Shandong (CN); Zuohui Li, Shandong (CN); Haihua Zhang, Shandong (CN); Zhijun Tang, Shandong (CN); Yanjun Zhou, Shandong (CN)

(73) Assignee: SINOPEC SHENGLI PETROLEUM ENGINEERING CO., LTD. DRILLING TECHNOLOGY RESEARCH INSTITUTE, Dongying, Shandong (CN)

( * ) Notice: Subject to any disclaimer, the term of this patent is extended or adjusted under 35 U.S.C. 154(b) by 87 days.

(21) Appl. No.: 15/505,060

(22) PCT Filed: Sep. 16, 2015

(86) PCT No.: PCT/CN2015/089714
§ 371 (c)(1),
(2) Date: Feb. 17, 2017

(87) PCT Pub. No.: WO2016/050142
PCT Pub. Date: Apr. 7, 2016

(65) Prior Publication Data
US 2017/0284158 A1    Oct. 5, 2017

(30) Foreign Application Priority Data
Sep. 29, 2014    (CN) .......................... 2014 1 0515605

(51) Int. Cl.
*E21B 7/06*    (2006.01)
*E21B 47/01*    (2012.01)
(Continued)

(52) U.S. Cl.
CPC ................ *E21B 7/062* (2013.01); *E21B 7/06* (2013.01); *E21B 47/011* (2013.01); *E21B 47/09* (2013.01);
(Continued)

(58) Field of Classification Search
CPC ... E21B 7/062; G01V 1/523; G01V 2001/526
(Continued)

(56) References Cited

U.S. PATENT DOCUMENTS

| 5,603,386 A * | 2/1997 | Webster ................. E21B 7/062 175/325.3 |
| 2002/0053470 A1* | 5/2002 | Noe ........................ E21B 7/062 175/62 |

(Continued)

*Primary Examiner* — Taras P Bemko

(57) ABSTRACT

A push-the-bit rotary guiding device includes a mandrel having a central passage, a sleeve rotatably sleeved outside the mandrel, a plurality of swing ribs circumferentially arranged in an outer wall of the sleeve with an interval, an actuation mechanism for controlling each swing rib to swing respectively, a plurality of detectors for detecting a distance to a well wall in real-time, and a controller for determining whether the actuation mechanism is required to actuate the swing ribs to swing according to the detected distance. Through a real-time detection of the detectors of the push-the-bit rotary guiding device, a well section having an expanded or reduced diameter is detected in time and guiding of the rotary guiding device herein is avoided. The rotary guiding device has advantages of a simple and compact structure, convenient machining, easy assembling, and a safe and highly-efficient operation, and is easy to be popularized and applied.

12 Claims, 1 Drawing Sheet

(51) Int. Cl.
*E21B 47/09* (2012.01)
*G01V 1/52* (2006.01)

(52) U.S. Cl.
CPC ............ *E21B 47/091* (2013.01); *G01V 1/523* (2013.01); *G01V 2001/526* (2013.01)

(58) Field of Classification Search
USPC .......................................................... 175/24
See application file for complete search history.

(56) References Cited

U.S. PATENT DOCUMENTS

2007/0163808 A1* 7/2007 Campbell ............. E21B 10/322
 175/57
2014/0305704 A1* 10/2014 Benson ..................... E21B 7/04
 175/40

\* cited by examiner

PUSH-THE-BIT ROTARY GUIDING DEVICE AND APPLICATION METHOD THEREOF

CROSS REFERENCE OF RELATED APPLICATION

This is a U.S. National Stage under 35 U.S.C. 371 of the International application Ser. No. PCT/CN2015/089714, filed Sep. 16, 2015, which claims priority under 35 U.S.C. 119(a-d) to CN 201410515605.4, filed Sep. 29, 2014.

BACKGROUND OF THE PRESENT INVENTION

Field of Invention

The present invention relates to a technical field of petroleum drilling, and more particularly to a push-the-bit rotary guiding device and an application method thereof.

Description of Related Arts

In the field of drilling technology, the rotary steerable drilling system is widely applied. According to the requirement of trajectory control, during a rotary drilling process, the rotary steerable drilling system is able to adjust a well deviation and a direction in real-time, so as to increase the drilling speed.

The rotary steerable drilling system, through the rotary guiding device thereof, actuates the drill bit or the drill column to make a directional deviation, thereby guiding a direction. According to the different guiding manners, the rotary guiding device is divided into the push-the-bit rotary guiding device and the point-the-bit rotary guiding device. The push-the-bit rotary guiding device directly provides a lateral force for the drill bit at a position near the drill bit, while the point-the-bit rotary guiding device bends the drill column near the drill bit, so that the drill bit points to a wellbore trajectory control direction.

During the drilling process, since the lithology of the formation drilled by the drilling tool is changeable, the size of the well wall is not sufficiently stable and the size of the wellbore changes with the formation lithology, leading that the well sections in the formation having the different lithology may have an expanded or reduced diameter. Since the guiding function of the rotary guiding device depends upon the strength and the direction of the thrust force of the ribs against the well wall, when the size of the wellbore changes, the contact state between the ribs and the well wall is also changed, causing the strength of the thrust force being changed and the guiding direction of the rotary guiding device deviating from the preset direction.

In order to avoid guiding of the rotary guiding device deviating from the preset direction, the well sections having the expanded or reduced diameter are avoided and then the rotary guiding device is started for guiding. However, the conventional rotary guiding device is unable to detect the well section having the expanded or reduced diameter in real-time, causing guiding of the rotary guiding device easily deviating from the preset direction, and the dissatisfactory well deviation and direction of the drilled inclined well.

SUMMARY OF THE PRESENT INVENTION

To solve the above problem, an object of the present invention is to provide a push-the-bit rotary guiding device and an application method thereof. The rotary guiding device is able to detect a well section having an expanded or reduced diameter in real-time, thereby avoiding guiding of the rotary guiding device deviating from a preset direction and guaranteeing a well deviation and a direction of a drilled inclined well.

The present invention provides a push-the-bit rotary guiding device, comprising: a mandrel having a central passage; a sleeve, which is rotatably sleeved outside the mandrel; a plurality of swing ribs, which are circumferentially arranged in an outer wall of the sleeve with an interval; an actuation mechanism, for controlling each swing rib to swing respectively; a plurality of detectors, which are circumferentially arranged in the outer wall of the sleeve with an interval and able to detect a distance to a well wall in real-time; and a controller, for determining whether the actuation mechanism is needed to actuate the swing ribs to swing through the detected distance.

Preferably, the detectors are ultrasonic sensors.

Preferably, a mounting slot is provided on the outer wall of the sleeve; and each ultrasonic sensor comprises a transduction unit which is fixedly arranged in the mounting slot and able to realize a detecting function, and a protection window which is fixed at an opening at a top end of the mounting slot.

Preferably, each ultrasonic sensor further comprises a shock absorbing seat arranged between a bottom surface of the mounting slot and the transduction unit, a sound transmission window arranged between the protection window and the transduction unit; and a pressure maintaining filler which is sealed in the mounting slot by the sound transmission window.

Preferably, the protection window is made of a stainless steel material, and has a plurality of sound transmission holes thereon; the sound transmission window is made of fluororubber or silicone rubber; and the pressure maintaining filler is silicone oil.

Preferably, the number of the swing ribs is same as the number of the detectors; and each swing rib is circumferentially aligned with the corresponding detector.

Preferably, a circumferential groove is provided on an outer wall of the mandrel; and the sleeve is arranged in the circumferential groove and able to rotate independently.

Preferably, the rotary guiding device further comprises a clutch for cutting off or transferring a power from the mandrel to the sleeve.

The present invention further provides an application method of the push-the-bit rotary guiding device, comprising steps of:

through the detectors of the push-the-bit rotary guiding device, detecting a distance between each detector and the well wall in real-time; and determining whether the distance is in a normal range; if the distance is in the normal range, actuating each swing rib to swing respectively by the actuation mechanism of the push-the-bit rotary guiding device; if the distance is not in the normal range; stopping the actuation mechanism.

Preferably, the normal range is $(R_h-\Delta min)-(R_h+\Delta max)$, and a non-normal range is not in a range of $(R_h-\Delta min)-(R_h+\Delta max)$; wherein: $R_h$ is equivalent to subtracting a distance between the corresponding detector and a central axis of the mandrel from a radius of a standard wellbore; $\Delta min$ is a lower limit value; and $\Delta max$ is an upper limit value.

According to the push-the-bit rotary guiding device provided by the present invention, through a real-time detection of the detectors, the well section having the expanded or reduced diameter is detected in time and guiding of the rotary guiding device herein is avoided, thereby avoiding guiding of the rotary guiding device deviating from the preset direction and guaranteeing the well deviation and the direction of the drilled inclined well.

According to the push-the-bit rotary guiding device provided by the present invention, the ultrasonic sensors are able to not only avoid guiding of the rotary guiding device in the well section having the expanded or reduced diameter, but also continuously measure a well diameter, so that a change condition of the well diameter with a depth is obtained, and a spatial structure of the oil well is simulated in a computer.

The push-the-bit rotary guiding device provided by the present invention has advantages of a simple and compact structure, convenient machining, easy assembling, and a safe and highly-efficient operation, and is easy to be popularized and applied.

BRIEF DESCRIPTION OF THE DRAWINGS

The present invention is described in more detail as follows, based on the preferred embodiment and with reference to accompanying drawings.

In the accompanying drawings, same elements are marked by the same reference characters. The accompanying drawings are not drawn according to an actual scale.

DETAILED DESCRIPTION OF THE PREFERRED EMBODIMENT

The present invention is further described with accompanying drawings.

Figure 1:
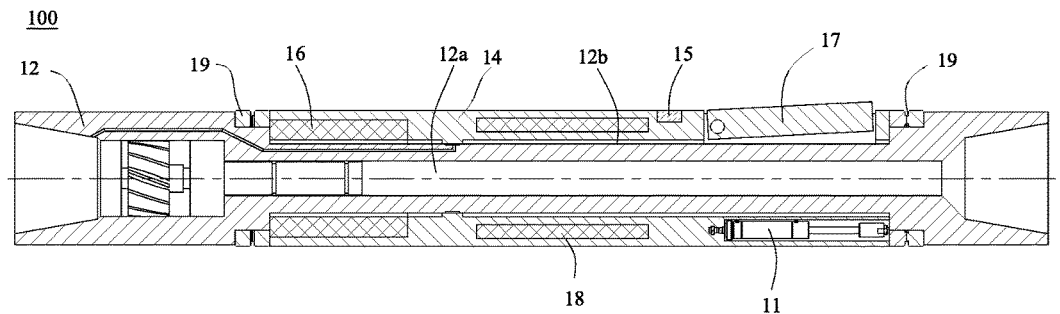
FIG. 1 is a structural sketch view of a push-the-bit rotary guiding device according to a preferred embodiment of the present invention.

FIG. 1 shows a push-the-bit rotary guiding device 100 (hereinafter referred to as rotary guiding device 100) provided by the present invention. The rotary guiding device 100 is able to actuate a drill bit or a drill column to make a directional deviation smoothly, thereby generating a guiding function.

According to the preferred embodiment of the present invention, the rotary guiding device 100 comprises a mandrel 12 having a central passage 12a, and a sleeve 14 which is rotatably sleeved outside the mandrel 12; wherein: an upstream end of the mandrel 12, through a thread structure thereof, is able to connect with a drilling tool or a mud motor; and a downstream end of the mandrel 12, through a thread structure thereof, is able to connect with a drill pipe or an adapter of the drill bit.

In order to prevent the sleeve 14 from moving back and forth on the mandrel 12, a circumferential groove 12b is provided on an outer wall of the mandrel 12, and the sleeve 14 is arranged in the circumferential groove 12b, wherein the circumferential groove 12b is preferred to be located at a center of the outer wall of the mandrel 12, and has two circular side walls and a bottom surface. In order to achieve a smooth rotation of the sleeve 14, a radial bearing such as a deep groove ball bearing is arranged between an inner wall of the sleeve 14 and the bottom surface of the circumferential groove 12b of the mandrel 12, so as to allow the sleeve 14 to rotate independently. Meanwhile, a first thrust bearing 19 is arranged between an upstream end (an end near a left side, as shown in FIG. 1) of the sleeve 14 and a left side wall of the circumferential groove 12b, and a second thrust bearing 19 is arranged between a downstream end (an end near a right side, as shown in FIG. 1) of the sleeve 14 and a right side wall of the circumferential groove 12b, so as to provide an axial support for the mandrel 12, and enable the mandrel 12 to withstand a bit pressure and a weight of the drilling tool.

According to the present invention, the push-the-bit rotary guiding device 100 further comprises a plurality of swing ribs 17 which are circumferentially arranged in an outer wall of the sleeve 14 with an interval, and the swing ribs 17 can be referred to as ribs 17. After swinging, ends of the ribs 17 are able to lean against a well wall, so as to provide a lateral force required by guiding. In order to ensure a swing of the ribs 17, the rotary guiding device 100 further comprises an actuation mechanism 18, for controlling each rib 17 to swing independently. The actuation mechanism 18 is preferred to be a hydraulic mechanism; the actuation mechanism 18 and the ribs 17 are well known to one skilled in the art, and thus not described in detail.

According to the present invention, the rotary guiding device 100 further comprises a plurality of detectors 15 which are circumferentially arranged in the outer wall of the sleeve 14 with an interval and able to detect a distance to the well wall in real-time. Meanwhile, the rotary guiding device 100 further comprises a controller 16. The controller 16, through the distance detected by each detector 15, determines a size of a wellbore at a detected position, and determines whether the wellbore is suitable for guiding. Whether the wellbore is suitable for guiding depends upon whether an expansion or reduction degree of a diameter of the wellbore is in a normal range, wherein: the normal range is $(R_h-\Delta min)-(R_h+\Delta max)$; $R_h$ is equivalent to subtracting a distance between the corresponding detector 15 and a central axis of the mandrel 12 from a radius of a standard wellbore; $\Delta min$ is a lower limit value; and $\Delta max$ is an upper limit value. The radius of the standard wellbore is a preset value, $\Delta min$ can be selected as 15-25 mm, and $\Delta max$ can be selected as 10-20 mm. If the wellbore is suitable for guiding, the actuation mechanism 18 controls each rib 17 to swing correspondingly, so as to provide the lateral force required by guiding; and if the wellbore is not suitable for guiding, the controller 16 will not start the actuation mechanism 18, in such a manner that guiding of the rotary guiding device 100 in a well section having an expanded or reduced diameter is avoided, thereby avoiding guiding of the rotary guiding device 100 deviating from a preset direction and guaranteeing a well deviation and a direction of a drilled inclined well.

Furthermore, the number of the swing ribs 17 is same as the number of the detectors 15, and each swing rib 17 is circumferentially aligned with the corresponding detector 15, in such a manner that the detected distance is closer to a distance between the corresponding swing rib 17 without swinging and the well wall, and it becomes easy for the controller 16 to control each swing rib 17 more accurately. Each detector 15 is arranged near the corresponding swing rib 17, in such a manner that it becomes easy for the controller 16 to control each swing rib 17 more accurately.

Furthermore, the rotary guiding device 100 further comprises an attitude detector and a pressure sensor, which are connected with the controller 16. The attitude detector is feasible to be a three-axis acceleration sensor, for detecting a spatial attitude of the rotary guiding device 100, comprising a well deviation angle at a located position of the rotary guiding device 100 and a tool face angle of each rib 17. Through the controller 16, the three-axis acceleration sensor and the pressure sensor rapidly calculate, and obtain the spatial attitude of the rotary guiding device 100 and a pressure withstood by each swing rib 17 from the hydraulic mechanism. The three-axis acceleration sensor, the pressure sensor and the controller 16 are well known to one skilled in the art, and thus not described in detail.

The detectors 15 are preferred to be ultrasonic sensors, and any other sensor, which is able to detect a distance to the well wall in real-time, is also feasible. The ultrasonic sensors are able to not only avoid guiding of the rotary guiding device 100 in the well section having the expanded or reduced diameter, but also continuously measure a well diameter, so that a change condition of a size of the wellbore with a depth is obtained, and a spatial structure of an oil well is simulated in a computer.

Figure 2:
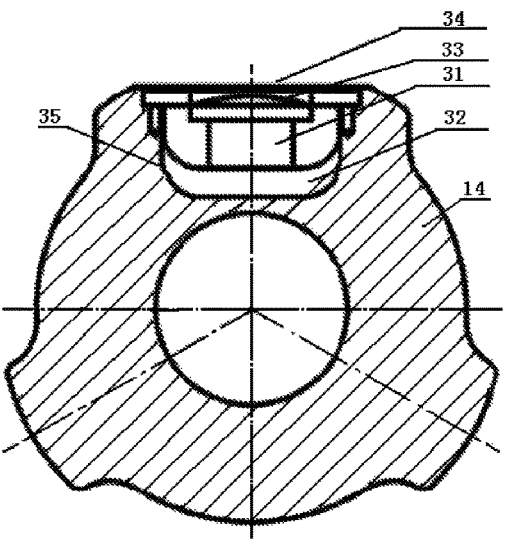
FIG. 2 is a structural sketch view of a detector of the push-the-bit rotary guiding device according to the preferred embodiment of the present invention, wherein a sleeve is also showed in FIG. 2.

In order to ensure a structure of each ultrasonic sensor is difficult to be broken, a mounting slot 35 is provided on the outer wall of the sleeve 14, as shown in FIG. 2. Each ultrasonic sensor comprises a transduction unit 31 which is fixedly arranged in the mounting slot 35 and able to realize a detecting function, and a protection window 34 which is fixed at an opening at a top end of the mounting slot 35, wherein: the transduction unit 31 is feasible to be a transducer, which is required to withstand a high temperature and a high pressure (namely 150° C. and 150 MPa). The controller 16 sends a drive signal, thereafter the transducer is able to send and receive a sound wave, and a distance to be measured is calculated through a propagation time of the sound wave. The protection window 34 is made of a stainless steel material, and has a plurality of sound transmission holes thereon. The protection window 34 not only prevents the transduction unit 31 from a friction of the well wall, but also prevents mud particles from entering the mounting slot 35.

Furthermore, each ultrasonic sensor further comprises a shock absorbing seat 32 which is arranged between a bottom surface of the mounting slot 35 and the transduction unit 31, a sound transmission window 33 arranged between the protection window 34 and the transduction unit 31, and a pressure maintaining filler (not shown in figures) which is sealed in the mounting slot 35 by the sound transmission window 33. The shock absorbing seat 32 can be made of a rubber material, and the sound transmission window 33 can be made of a material having an acoustic impedance matching silicone oil and wellbore mud, such as fluororubber and silicone rubber. The sound transmission window 33 made of such a material is beneficial to a decrease of an attenuation of the sound wave during a propagation process of the sound wave. The pressure maintaining filler is preferred to be a material matching the wellbore mud, such as the silicone oil, so that an internal pressure and an external pressure of each detector 15 are guaranteed to achieve a balance.

Figure 3:
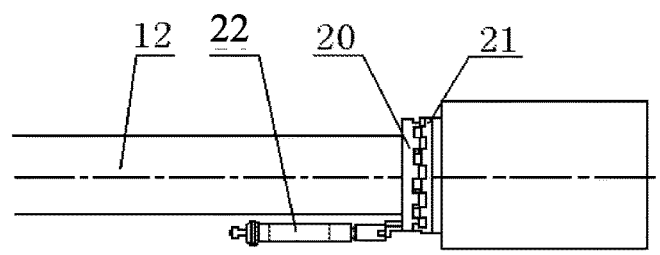
FIG. 3 is a sketch view of a clutch and a mandrel of the push-the-bit rotary guiding device according to the preferred embodiment of the present invention.

As shown in FIG. 1 and FIG. 3, the rotary guiding device 100 further comprises a clutch 11, which is able to cut off or transfer a power from the mandrel 12 to the sleeve 14. The clutch 11 comprises: a driving member 21 and a driven member 20, which are arranged between the mandrel 12 and the sleeve 14; and a pushing unit 22, which actuates the driving member 21 to separate from or connect with the driven member 20; wherein: the pushing unit 22 is feasible to be a linear motor, a hydraulic cylinder or an electromagnetic displacement mechanism, so as to cut off or transfer the power between the mandrel 12 and the sleeve 14. The driven member 20 and the driving member 21 are both located outside or inside a radial direction of the thrust bearings 19, and are feasible to be two gears which mesh with each other, two splines which cooperate with each other, or two friction wheels which rub against each other.

Through the clutch 11, the rotary guiding device 100 is able to cut off or transfer the power from the mandrel 12 to the sleeve 14. When guiding is required during a drilling process, the clutch 11 cuts off the power from the mandrel 12 to the sleeve 14, and allows the sleeve 14 not to rotate with the mandrel 12 but keep still relative to the well wall, thereby ensuring a deviating force provided by the rotary guiding device 100 is accurate and sufficient, so that the drill bit makes a directional deviation smoothly. When guiding is not required during the drilling process, the clutch 11 transfers the power of the mandrel 12 to the sleeve 14, actuates the sleeve 14 to synchronously rotate with the mandrel 12, and increases a rotational inertia and an energy storage of the rotary guiding device 100, which is beneficial to highly-efficient and stable drilling of the drill bit.

According to the present invention, an application method of the push-the-bit rotary guiding device 100 comprises steps of: firstly, through the detectors 15, detecting a distance between each detector 15 and the well wall in real-time; and determining whether the detected distance is in the normal range; if the distance is in the normal range, controlling the actuation mechanism 18 by the rotary guiding device 100 through the controller 16, and actuating each rib 17 to swing respectively through the actuation mechanism 18; if the distance is not in the normal range, stopping the actuation mechanism 18 by the controller 16; wherein: the normal range is $(R_h-\Delta min)-(R_h+\Delta max)$; $R_h$ is equivalent to subtracting the distance between the corresponding detector 15 and the central axis of the mandrel 12 from the radius of the standard wellbore; $\Delta min$ is the lower limit value; and $\Delta max$ is the upper limit value. The radius of the standard wellbore is the preset value, $\Delta min$ can be selected as 15-25 mm, and $\Delta max$ can be selected as 10-20 mm. Through the above control manner, guiding of the rotary guiding device 100 in the well section having the expanded or reduced diameter is avoided, and thus a deviation of guiding from the preset direction is avoided, which guarantees an inclination of the drilled inclined well achieves an ideal effect.

According to the present invention, through the detectors 15, the push-the-bit rotary guiding device 100 is able to detect the well section having the expanded or reduced diameter in real-time, which avoids guiding of the rotary guiding device 100 deviating from the preset direction, thereby guaranteeing the inclination of the drilled inclined well.

Although the present invention has been described with reference to the preferred embodiment, within a scope of the present invention, various modifications can be made, and it is feasible to use the equivalent to replace the part described in the present invention. In particular, as long as no structure conflict exists, technical features mentioned in the preferred embodiment can be combined in any manner. The present invention is not limited to the disclosed preferred embodiment in the specification, but includes all technical schemes within the scope of the following claims.

What is claimed is:

1. A push-the-bit rotary guiding device, comprising: a mandrel having a central passage; a sleeve, which is rotatably sleeved outside the mandrel; a plurality of swing ribs, which are circumferentially arranged in an outer wall of the sleeve with an interval; an actuation mechanism, for controlling each swing rib to swing respectively; a plurality of detectors, which are circumferentially arranged in the outer wall of the sleeve with an interval and for detecting a distance to a well wall in real-time; and a controller, for determining whether the actuation mechanism is required to actuate the swing ribs to swing according to the detected distance; wherein: the detectors are ultrasonic sensors; a mounting slot is provided on the outer wall of the sleeve; and each ultrasonic sensor comprises a transduction unit which is fixedly arranged in the mounting slot and able to realize a detecting function, and a protection window which is fixed at an opening at a top end of the mounting slot.

2. The push-the-bit rotary guiding device, as recited in claim 1, wherein each ultrasonic sensor further comprises a shock absorbing seat arranged between a bottom surface of the mounting slot and the transduction unit, a sound transmission window arranged between the protection window and the transduction unit, and a pressure maintaining filler which is sealed in the mounting slot by the sound transmission window.

3. The push-the-bit rotary guiding device, as recited in claim 2, wherein each swing rib is circumferentially aligned with the corresponding detector.

4. The push-the-bit rotary guiding device, as recited in claim 2, wherein: the protection window is made of a stainless steel material, and has a plurality of sound transmission holes thereon; the sound transmission window is made of fluororubber or silicone rubber; and the pressure maintaining filler is silicone oil.

5. The push-the-bit rotary guiding device, as recited in claim 4, wherein each swing rib is circumferentially aligned with the corresponding detector.

6. The push-the-bit rotary guiding device, as recited in claim 4, wherein: a circumferential groove is provided on an outer wall of the mandrel; and the sleeve is arranged in the circumferential groove and able to rotate independently.

7. The push-the-bit rotary guiding device, as recited in claim 4, further comprising a clutch for cutting off or transferring a power from the mandrel to the sleeve.

8. The push-the-bit rotary guiding device, as recited in claim 1, wherein each swing rib is circumferentially aligned with the corresponding detector.

9. The push-the-bit rotary guiding device, as recited in claim 1, wherein: a circumferential groove is provided on an outer wall of the mandrel; and the sleeve is arranged in the circumferential groove and able to rotate independently.

10. The push-the-bit rotary guiding device, as recited in claim 1, further comprising a clutch for cutting off or transferring a power from the mandrel to the sleeve.

11. An application method of a push-the-bit rotary guiding device, wherein:
the push-the-bit rotary guiding device comprises: a mandrel having a central passage; a sleeve, which is rotatably sleeved outside the mandrel; a plurality of swing ribs, which are circumferentially arranged in an outer wall of the sleeve with an interval; an actuation mechanism, for controlling each swing rib to swing respectively; a plurality of detectors, which are circumferentially arranged in the outer wall of the sleeve with an interval and for detecting a distance to a well wall in real-time; and a controller, for determining whether the actuation mechanism is required to actuate the swing ribs to swing according to the detected distance;
the detectors are ultrasonic sensors;
a mounting slot is provided on the outer wall of the sleeve; and each ultrasonic sensor comprises a transduction unit which is fixedly arranged in the mounting slot and able to realize a detecting function, and a protection window which is fixed at an opening at a top end of the mounting slot;
each ultrasonic sensor further comprises a shock absorbing seat arranged between a bottom surface of the mounting slot and the transduction unit, a sound transmission window arranged between the protection window and the transduction unit, and a pressure maintaining filler which is sealed in the mounting slot by the sound transmission window;
the protection window is made of a stainless steel material, and has a plurality of sound transmission holes thereon; the sound transmission window is made of fluororubber or silicone rubber; and the pressure maintaining filler is silicone oil;
each swing rib is circumferentially aligned with the corresponding detector;
a circumferential groove is provided on an outer wall of the mandrel; and the sleeve is arranged in the circumferential groove and able to rotate independently;
the push-the-bit rotary guiding device further comprises a clutch for cutting off or transferring a power from the mandrel to the sleeve; and
the application method comprises steps of:
through the detector of the push-the-bit rotary guiding device, detecting a distance between each detector and a well wall in real-time; and
determining whether the distance is in a normal range; if the distance is in the normal range, actuating each swing rib to respectively swing by the actuation mechanism of the push-the-bit-rotary guiding device; if the distance is not in the normal range, stopping the actuation mechanism.

12. The application method, as recited in claim 11, wherein: the normal range is $(R_h-\Delta \min)-(R_h+\Delta \max)$; $R_h$ is equivalent to subtracting a distance between the detector and a central axis of the mandrel from a radius of a standard wellbore; $\Delta \min$ is a lower limit value; and $\Delta \max$ is an upper limit value.

* * * * *